(12) United States Patent
Booton

(10) Patent No.: US 7,742,461 B2
(45) Date of Patent: Jun. 22, 2010

(54) METHOD FOR REMOTELY ASSOCIATING A COMMUNICATIONS DEVICE WITH A COMPUTER

(75) Inventor: Laurence J Booton, Woodbridge (GB)

(73) Assignee: British Telecommunications plc, London (GB)

( * ) Notice: Subject to any disclaimer, the term of this patent is extended or adjusted under 35 U.S.C. 154(b) by 1126 days.

(21) Appl. No.: 10/573,265

(22) PCT Filed: Sep. 29, 2004

(86) PCT No.: PCT/GB2004/004166

§ 371 (c)(1),
(2), (4) Date: Mar. 23, 2006

(87) PCT Pub. No.: WO2005/034496

PCT Pub. Date: Apr. 14, 2005

(65) Prior Publication Data

US 2007/0081517 A1    Apr. 12, 2007

(30) Foreign Application Priority Data

Sep. 30, 2003  (GB) .................................. 0322895.4

(51) Int. Cl.
*H04L 12/66* (2006.01)

(52) U.S. Cl. ...................................... 370/352; 370/356
(58) Field of Classification Search ................. 370/260, 370/335, 352–356; 379/265.02
See application file for complete search history.

(56) References Cited

U.S. PATENT DOCUMENTS

| 5,907,547 A | 5/1999 | Foladare et al. |
| 5,991,390 A | 11/1999 | Booton |
| 6,594,357 B1 | 7/2003 | Emerson |

FOREIGN PATENT DOCUMENTS

| EP | 0753956 A2 | 1/1997 |
| WO | WO 96/31044 | 10/1996 |
| WO | WO 99/51015 | 10/1999 |
| WO | WO 02/076071 A1 | 9/2002 |

OTHER PUBLICATIONS

GB Search Report dated Jan. 16, 2004.
International Search Report dated Jan. 31, 2005.

*Primary Examiner*—Suhan Ni
(74) *Attorney, Agent, or Firm*—Nixon & Vanderhye PC

(57) ABSTRACT

A Computer Telephony Integration environment has reduced risk of inadvertent or fraudulent registration of the association of a user's computer terminal with the wrong telephone, i.e. one other than the telephone adjacent to the computer terminal or the user's mobile telephone, a host computer instructs the user via a screen display to call a particular extension of a CTI-enabled communications switching system.

24 Claims, 3 Drawing Sheets

METHOD FOR REMOTELY ASSOCIATING A COMMUNICATIONS DEVICE WITH A COMPUTER

This application is the US national phase of international application PCT/GB2004/004166 filed 29 Sep. 2004 which designated the U.S. and claims benefit of GB 0322895.4, dated 30 Sep. 2003, the entire content of which is hereby incorporated by reference.

BACKGROUND

1. Technical Field

This invention relates to a method of associating a communications device with a computer terminal.

2. Related Art

Methods are known for remotely registering the association of a communications device such as a telephone terminal with a computer terminal over a distributed computer system, such as a Computer Telephony Integration (CTI) environment, so that a remote host can associate a particular computer terminal with a telephone terminal. These methods are used, for example, to enable a user to register their operation of a particular computer terminal and telephone terminal so that a remote host can redirect incoming communications at a remote site to the user.

The present exemplary embodiment seeks to simplify the registration process and to enable the association to be implemented using more cost effective technology by eliminating the need for an interactive voice response (IVR) system to be provided to assist in the association process. A known use of an interactive voice response system provided in a distributed computer system is to enable a user to remotely register via a telephone system the association of a telephone terminal and a computer terminal being operated by the user within the computer system. The terms "distributed computer system" and "distributed computer environment" are used herein to denote a client/server type computer system, for example in which each client may comprise a computer terminal capable of being associated with at least one telephone terminal.

CTI is particularly useful in call centres, and International Application Number PCT/GB96/00727 (Publication Number WO 96/31044, now also issued U.S. Pat. No. 5,991,390) in the name of BRITISH TELECOMMUNICATIONS public limited company (BT) discloses an Automatic Call Distribution (ACD) suite in a call centre such as BT's national telephone account management operation, the contents of which are hereby incorporated by reference. International Application Number PCT/GB96/00727 (Publication Number WO 96/31044) describes a known ACD suite in a call centre, which is now described only briefly in respect of its component parts, and relevant operational characteristics with reference to FIG. 1 of the accompanying drawings.

In FIG. 1, a known ACD suite comprises a PABX 10, constituting a switching system of the present invention. The PABX 10 is associated with an ACD system 12 and connected to an Integrated Services Digital Network (ISDN) 14 by a primary rate ISDN link 16 having thirty 64 kbit/s channels.

Customers, represented by telephone terminal 18, can make calls to the call centre by dialling the published directory number (also referred to as a national number or a destination terminal number) of the call centre. These incoming calls are received at the PABX 10 and placed in a queue by the ACD system 12. The ACD system 12 in known manner allocates the call at the head of that queue to a selected one of a plurality of call centre agent positions 20 (also referred to as workstations), each comprising a telephone terminal 22 (also referred to as an ACD turret) and an associated computer terminal 24. The association of each agent's workstation to the agent's telephone terminal is indicated by the dashed boundary in FIG. 1.

The agent whose terminal 22 is selected to answer the call is normally the agent at the head of a queue of free agents. This queue contains the identities of the agents, but alternatively can contain the directory numbers associated with the agents. Similarly, tele-working agents, represented by remote workstation 21 comprising telephone terminal 36 and associated computer terminal 38, can make calls to the call centre by dialling a published directory number of the call centre over a telephone link 40. Telephone link 40 is capable of supporting voice and data communication over different channels, such as in an ISDN link. However, the publication of the number of the call centre means that it is possible to abuse the registration system which associates a particular agent with a computer terminal and telephone terminal.

Consider where each computer terminal 24 is constituted by a personal computer, commonly referred to as a PC, and is connected to a host computer 26 having an associated database 28 and connected to the PABX 10 via a CTI link 30. In the prior art, an interactive voice response system (IVR) 32 is connected to a port of the PABX 10 and to the host computer 26, and is arranged to obtain data from customers, and tele-working agents, and to pass this to the host computer 26 for processing as appropriate. In this way tele-working agents are able to be registered and customers are connected to agents in the call-centre or remote tele-working agents as appropriate.

In order to support tele-working, the ACD system 12 must still associate a tele-working agent's identity with the identity of what it deems to be an active terminal 22 in the call centre, and the manner in which this is achieved will now be described.

In a first situation, a tele-working agent will activate his or her computer terminal 38 which will autodial the directory number of the host computer 26. When a connection (using one of the B channels) has been established via the ISDN link 16, the tele-working agent will log on to the host computer 26 using an identification protocol including informing the host computer 26 of the directory number being currently used by the tele-working agent, and the host computer 26 will store the tele-working agent's directory number in association with the identity of tele-working agent. If the tele-working agent has a designated location or, for example, if the agent is not permitted to change location without prior consent of the company, the tele-working agent does not inform the host computer 26 of the identity of the remote terminal, and the host computer 26 will refer to its record and retrieve the appropriate data.

The host computer 26 will now select an available terminal 34 from its list of virtual turrets, associate the tele-working agent's identity with the identity of the selected terminal 34, and send them to the ACD system 12 via the CTI link 30. The host computer 26 now has a record associating the identity of the agent, the identity of the remote terminal 38, and the identity of the selected terminal 34 and can upon interrogation by the identity of a terminal 34 retrieve the identity of the corresponding remote terminal 38. The ACD system can then operate in a number of ways such as are described in more detail within International Application Number PCT/GB96/00727 (Publication Number WO 96/31044 and also now issued as U.S. Pat. No. 5,991,390).

U.S. Pat. No. 6,594,357 "Computer Telephone Integration", the contents of which are hereby incorporated by reference, describes another known method of associating a computer terminal with a telephone terminal which is shown in FIG. 2. In FIG. 2, the PABX 10 has a further terminal 34', identical with a terminal 34 but not forming part of the set of virtual terminals 34 used by the host computer 26 in association with the identities of tele-working agents, as described above.

The secure registration of telephone terminal/computer terminal according to the second example of the prior art is effected as follows. Consider first the situation of a local agent, i.e. one working at a workstation 20 whose telephone is directly connected to a port of the PABX 10. The host computer 26 is arranged to respond to initiation of a log on procedure by the agent via the keyboard of the computer terminal 24 at his workstation 20 to send to that computer terminal 24 data for a screen display containing a text message "Please dial extension XXXX. When the call is answered, please enter via your telephone keypad the codeword YYYY.".

The agent now responds to the message by dialling on his telephone 22, referred to herein as making a registration call, the extension XXXX, which is the extension number corresponding to the virtual terminal 34', and the PABX 10 responds in normal manner by connecting ringing current to the corresponding port. The host computer 26 knows, via the CTI link 30, that the virtual terminal 34' is "ringing", and instructs the PABX 10 to treat the call as answered by recording the corresponding line circuit as being in "off hook" condition, and to report any digits received at the PABX 10 for that call.

The PABX 10 is arranged, in a known manner, to collect digits dialled during the call. In a variant, the PABX 10 connects a digit collector, not shown, to the virtual terminal 34'. Upon receipt of a message from the PABX 10 containing the digits received from the agent, and the extension number of the telephone 22 from which they were sent, the host computer 26 compares these received digits with the code sent in the screen display information, and, if they match, stores the extension number in association with the identity of the computer terminal 24 and sends a further screen display to the computer terminal 24 containing the text message "Please hang up.". The agent has now been registered at the host computer 26 in association with his telephone terminal 22 and his computer terminal 24.

Known CTI systems such as are described by International Application Number PCT/GB96/00727 (Publication Number WO 96/31044), and U.S. Pat. No. 6,594,357 have the limitation that the method used to associate a computer terminal with a voice terminal requires an interactive voice response system (IVR). The IVR is connected to a port of a PABX 10 linked by a computer telephone integration link to a host computer and is arranged to obtain data from customers, and tele-working agents, and to pass this to the host computer 26 for processing as appropriate.

However, providing an IVR unit is costly and expensive. Each PABX in systems such as are described by the above prior art requires an associated IVR. This means that distributed ACD suites having a plurality of PABXs require a IVR unit for each PABX, which increases the cost of implementing such systems.

BRIEF SUMMARY

The invention seeks to provide a method of associating a computer terminal with a communications device such as a telephone terminal which obviates the need to install an IVR with each PABX in a distributed computer environment, especially but not exclusively, in CTI environments.

A first aspect of the invention seeks to provide a method of associating a computer terminal of a user with a communications device operable by the user within a computer system, the method comprising performing the following steps: generating an identifier for a communications line end-point; communicating the identifier to the communications device via the computer terminal; initiating a communication with the communications line endpoint using said communications device; and when a request for connection to the communications line end-point generated by the communications device is received by other apparatus within said computer system, recording an identifier for the communications device; and checking if said device identifier has already been associated with at least one other identifier for a communications line end-point previously communicated to the computer terminal, and in the event of a match, associating the communications device of the user with the computer terminal of the user.

The communications device may be a telephone terminal. The identifier for a communications line end-point may comprise a sequence of numerical digits. The sequence of numerical digits may comprise a telephoneable number. The identifier may be communicated to the communications device via the computer communicating the identifier for the communications line end-point to the user. The computer may communicate the identifier by displaying it to the user. In addition or alternatively, the computer may communicate the identifier by audibly announcing it to the user. The identifier for the communications line end-point may be automatically communicated to the communications device. An icon may be displayed to the user by the computer, and by activating the icon the computer may automatically communicate the identifier for the communications line end-point to the communications device. The identifier may be automatically communicated using a wireless communications link between the computer and the communications device. The communications link may be short-range.

The method may further comprise, in the event no match is obtained, iterating the steps of the method according to the first aspect at least once. In the second iteration of the method steps, the identifier for the communications line end-point may be communicated to the computer terminal only in response to a previous identifier for the communications device being associated with the computer terminal. The other apparatus may comprise a communications switching system. The communications switching system may comprise a PABX. The computer terminal may be arranged to prompt the user to perform at least one additional action when requesting connection to the communications line end-point. The additional action performed by the user may be to cause the communications device to revert to an on-hook status at a predetermined time. The additional action performed by the user may be to cause the communications device to go off-hook at a predetermined time. The additional action to be performed by the user may be to enter information on the computer terminal indicative of a signal audible by the user over the communications line used to request connection to the identifier for the communications end-point.

Another aspect of the invention seeks to provide a method of associating a computer terminal with a telephone terminal in a distributed computer system via a communications network, the computer terminal being associated with a unique computer identity and the telephone terminal being associated with a unique telephone terminal identity, the method comprising: providing a user a telephonable number associated with a communication switching system; requesting connection to the number using the telephone terminal;

detecting at the communications switching system, if a connection request to the number has been received; and if so, determining the telephone terminal identity of the telephone terminal from which the connection request generated and providing information indicating the telephone terminal identity and the number to which connection was requested to a host computer; processing the received information to determine if the telephone terminal identity is already associated with another telephone terminal identity, and in the event that the telephone terminal identity is not already associated with at least one another number provided by the host computer to the computer terminal, generating a subsequent different telephonable number associated with the communications switching system, and repeating said requesting, determining, and processing steps; and in the event the telephone terminal identity is already associated with at least one other number provided by the host computer to the computer terminal, determining if the telephone terminal identity satisfies at least one association criterion for associating the telephone terminal identity which has requested connection with the computer terminal identity to which at least one other telephonable number was provided, and in the event of the said at least one association criterion been met: registering the received identity of the telephone terminal in association with the identity of that computer terminal.

The telephonable number to which the telephone terminal first requested connection is preferably displayed by said computer terminal. Preferably, telephonable number to which the telephone terminal first requested connection is provided by the host computer to the computer terminal. Preferably, at least one telephonable number is generated randomly by said host computer and associated with said communications switching system.

Preferably, the communications switching system detects if connection has been requested to one of said telephonable numbers by detecting if a make call command has been invoked by the telephone terminal.

A third aspect of the invention seeks to provide a system arranged to associate a computer terminal with a telephone terminal in a distributed computer system via a communications network, the computer terminal being associated with a unique computer identity and the telephone terminal being associated with a unique telephone terminal identity, the system comprising: means for providing a user a telephonable number associated with a communications switching system; means for requesting connection to the number using the telephone terminal; means for detecting at the communications switching system, if a connection request to the number has been received; means for determining the telephone terminal identity of the telephone terminal from which the connection request generated and providing information indicating the telephone terminal identity and the number to which connection was requested to a host computer, in the event a connection request has been received; means for processing the received information to determine if the telephone terminal identity is already associated with another telephone terminal identity, and means for generating, in the event that the telephone terminal identity is not already associated with at least one another number provided by the host computer to the computer terminal, a subsequent different telephonable number associated with the communications switching system to be provided to said user; and means for determining, in the event the telephone terminal identity is already associated with at least one other number provided by the host computer to the computer terminal, if the telephone terminal identity satisfies at least one association criterion for associating the telephone terminal identity which has requested connection with the computer terminal identity to which at least one other telephonable number was provided, and means for registering, in the event of the said at least one association criterion been met, the received identity of the telephone terminal in association with the identity of that computer terminal.

Preferably, the telephonable number to which the telephone terminal first requested connection is displayed by said computer terminal. Preferably, the telephonable number to which the telephone terminal first requested connection is provided by the host computer to the computer terminal. Preferably, at least one telephonable number is generated randomly by said host computer and associated with said communications switching system.

Preferably, the communications switching system detects if connection has been requested to one of said telephonable numbers by detecting if a make call command has been invoked by the telephone terminal. Preferably, the means for providing, the means for generating, the means determining if the telephone terminal identity satisfies a least one association criterion, the means for processing, and the means for registering collectively constitute a subsystem. Preferably, the means to detect if a connection request has been received, the means for determining the identity of the telephone terminal requesting the connection constitutes a separate subsystem.

Preferably, a port on the communications switching system is associated with a telephonable number, and for each telephonable number the associated port is activated only for a predetermined amount of time determined by said host computer.

Preferably, a port of the communications switching system is deactivated after a connection request to the port has been received.

Preferably, one port associated with a telephonable number is activated at a time.

Preferably, the provision of a telephonable number to the computer terminal is associated with the on-set of the predetermined amount of time the port is activated for.

Preferably, the telephonable number is a random destination number assigned by the host computer.

Preferably, the communications switching system comprises a PABX.

Another aspect of the invention seeks to provide a method of registering the identity of a telephone terminal in association with the identity of a computer terminal, the method comprising the steps of: providing to a user of the computer terminal, via that computer terminal, the identity of a predetermined destination terminal number; detecting if a call has been requested to that predetermined destination terminal number; receiving the identity of a telephone terminal from which that call was made; storing at least one characteristic of the identity of the telephone terminal; providing to the user, via that computer terminal, a second destination telephone number; detecting if a call has been requested to the second destination terminal number; receiving the identity of a telephone terminal from which the second call was made; storing at least one characteristic of the identity of the telephone terminal used to dial the second destination number; comparing the received at least one characteristic of the telephone number used to dial the second destination number with the at least one characteristic of the telephone number used to dial the first destination telephone number; and performing a comparison check to determine if a match exists between the two sets of at least one characteristics of the first and second telephone terminals to register the received identity of the telephone terminal in association with the identity of that computer terminal.

Preferably, the step of providing the identity of a first predetermined destination terminal number is performed upon detection of a make call command made via that computer terminal.

Another aspect of the invention seeks to provide a method of associating a computer terminal of a user with a telephone terminal of the user within a distributed computer system, the method comprising iteratively performing the following steps:

generating a telephonable number which is communicated to the user via the computer terminal;

dialling the telephonable number using the telephone terminal; and when a request for connection to the telephonable number is received by other apparatus within said distributed computer system, recording a terminal identity of the telephone terminal; and checking if a previous record exists containing said telephone terminal identity in association with at least one other telephonable number communicated to the computer terminal, and in the event of a match, associating the telephone terminal of the user with the computer terminal of the user.

Preferably, in the second and subsequent iterations of the method steps, the telephonable number is communicated to the computer terminal only in response to a previous telephone terminal identity being associated with the computer terminal.

Preferably, the apparatus comprises a communications switching system.

Preferably, the communications switching system comprises a PABX.

Advantageously, the invention seeks to provide a method of registering the identity of a telephone terminal in association with the identity of a computer terminal in which it is no longer necessary to provide an IVR component in the CTI environment.

Advantageously, the invention seeks to improve the level of security when a computer terminal is associated with a telephone terminal over a communications network by a host computer.

Other aspects and preferred features are set out in the accompanying claims. The preferred features of the invention as set out by the accompanying dependent claims may be suitably combined with each other and with any of the different aspects of the invention as provided by the accompanying independent claims, as is apparent to those skilled in the art.

BRIEF DESCRIPTION OF THE DRAWINGS

Detailed embodiments of the invention will now be described with respect to the accompanying drawings which are by way of example only and in which.

DETAILED DESCRIPTION OF EXEMPLARY EMBODIMENTS

The best mode of the present invention will now be described with reference to specific embodiments of the invention. Those skilled in the art will appreciate only a limited number of embodiments can be described and that the invention is not intended to be limited to the embodiments described but instead should be accorded the scope defined by the accompanying claims.

Figure 1:
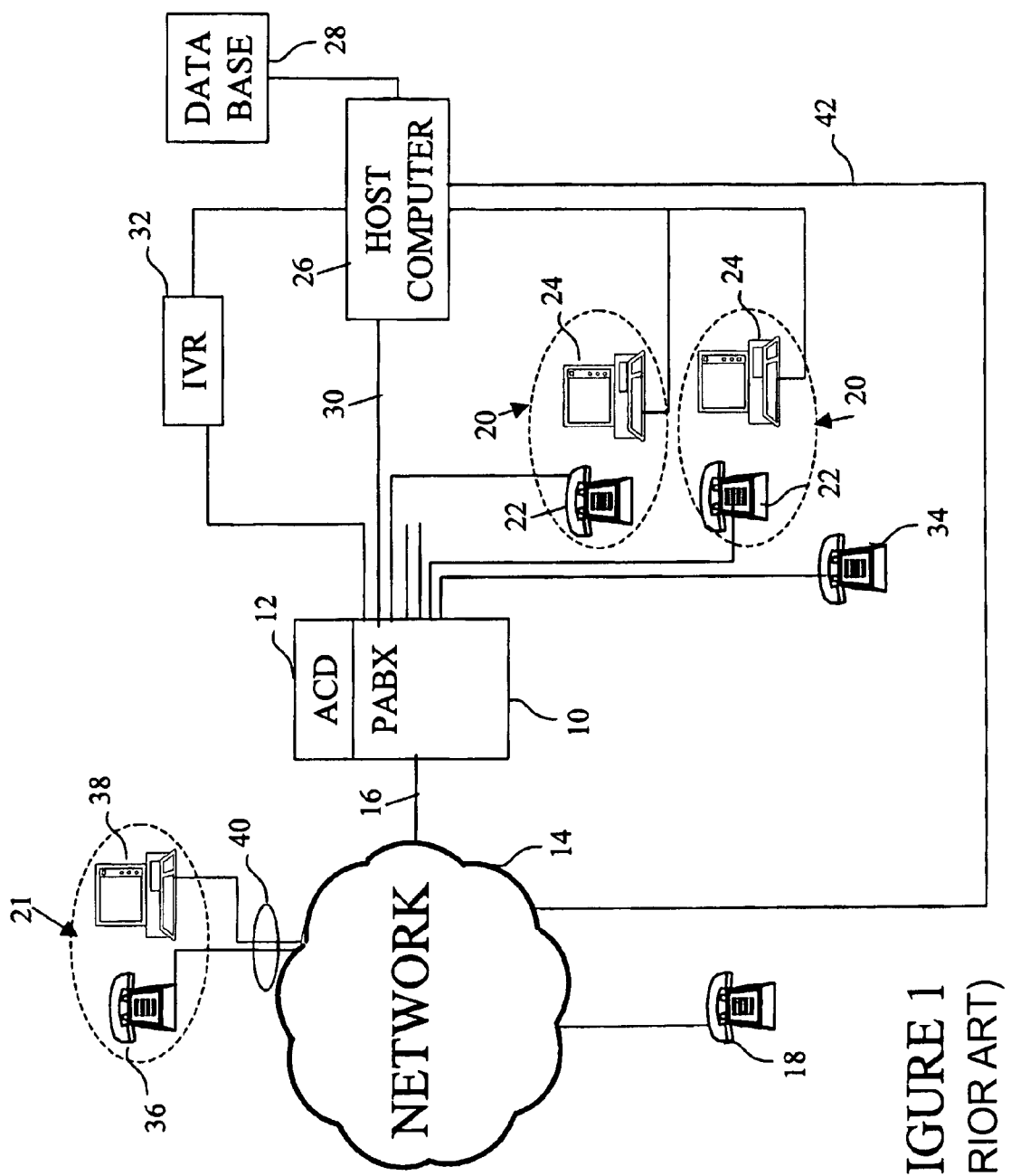
FIG. 1 shows a first prior art example of a known ACD suite.
Figure 2:
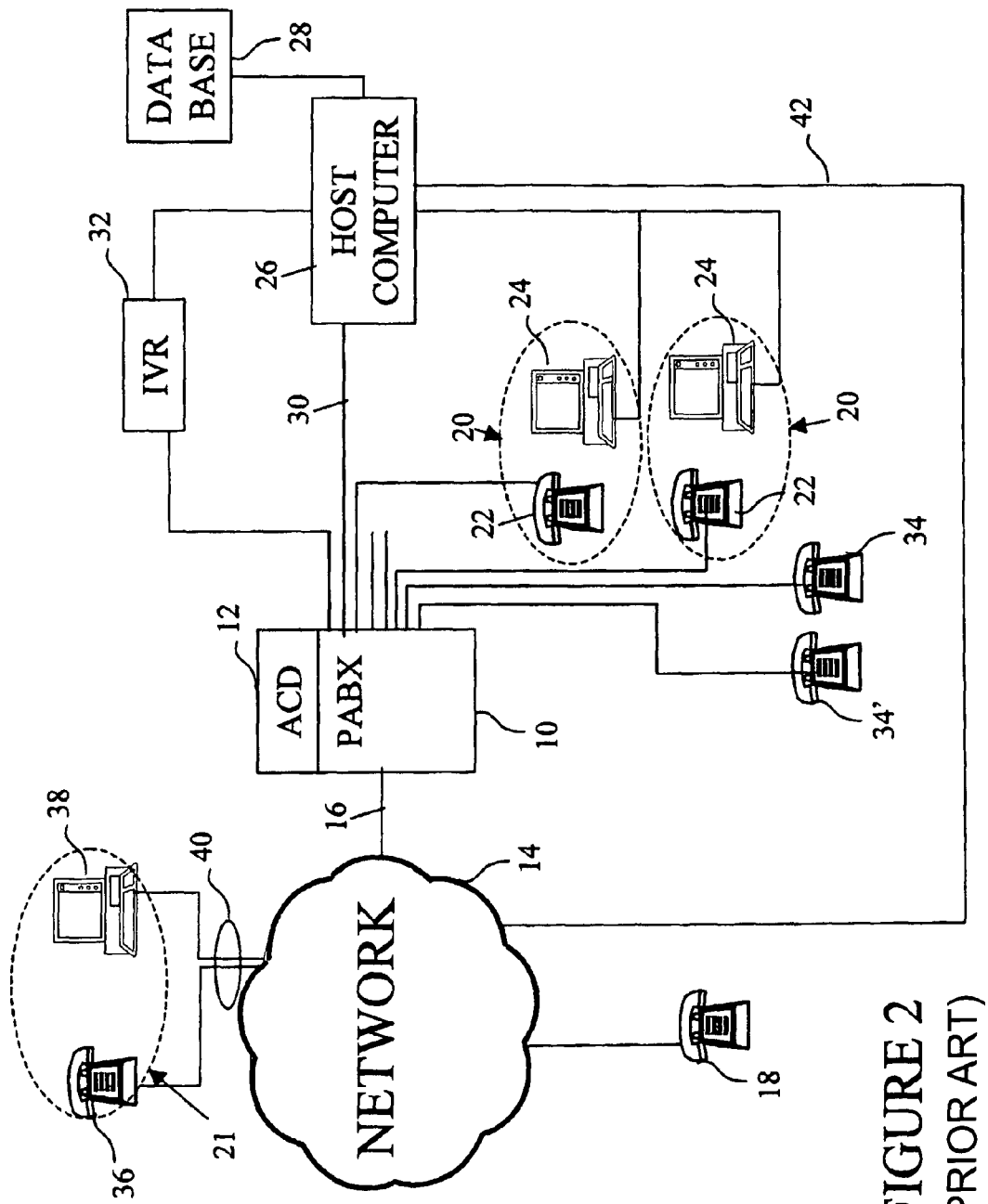
FIG. 2 shows a second prior art example of a known ACD suite.
Figure 3:
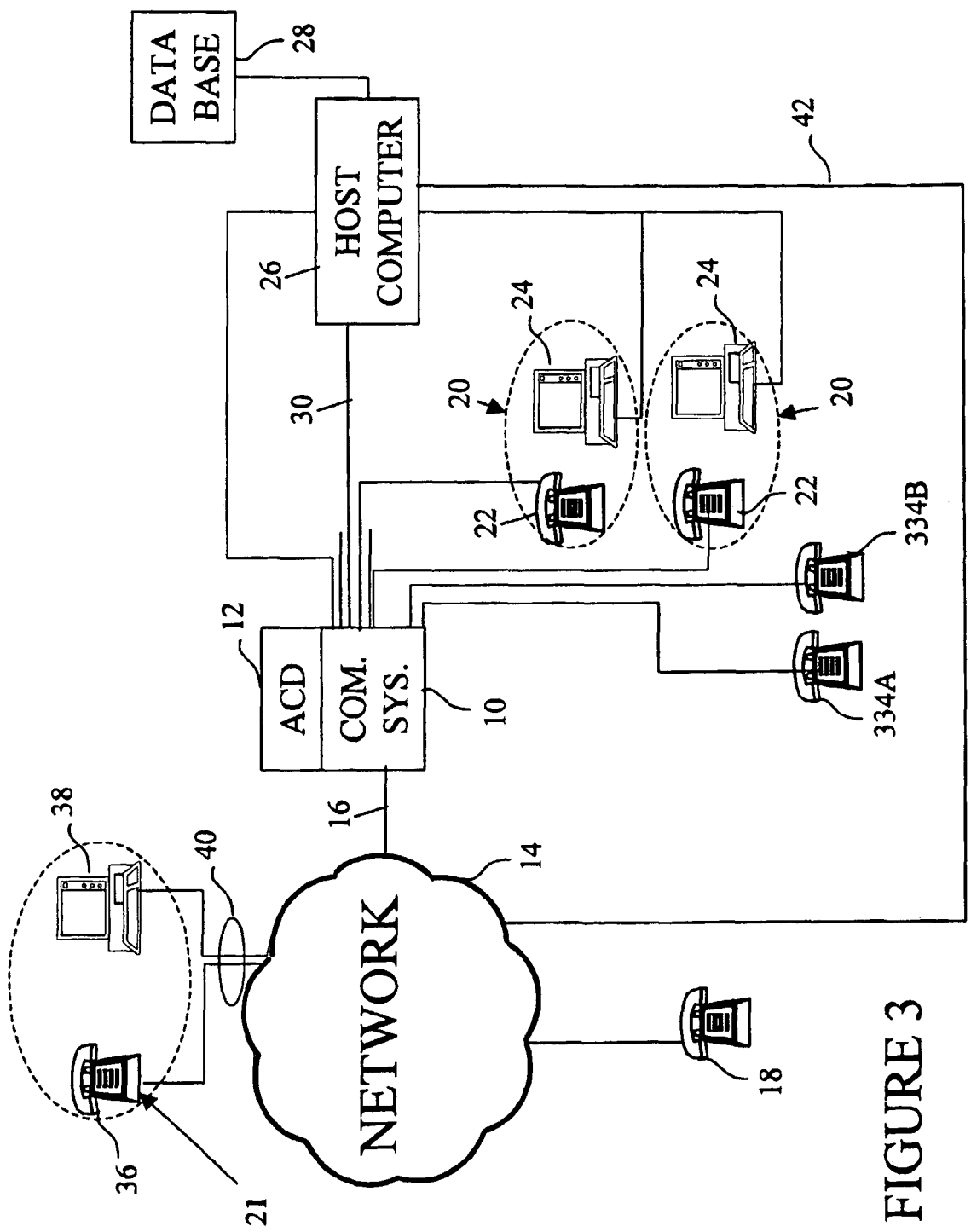
FIG. 3 shows an embodiment of the present invention.

FIG. 3 of the accompanying drawings shows similar elements to the elements indicated by FIGS. 1 and 2 of the drawings relating to prior art ACD suite environments. Like elements are indicated by the same numerals in the drawings. The present invention however, omits to indicate an element equivalent to interactive voice recognition unit 32 as the invention eliminates the need to associate an IVR with each PABX in an ACD suite environment by providing a method of associating a computer terminal with a telephone terminal which does not require voice communication. Advantageously the invention seeks to provide an improved and potentially more secure method of associating the identity of a telephone terminal with the identity of a computer terminal.

Referring now to FIG. 3 of the accompanying drawings, an ACD suite comprises a communications system 10 providing a switching system. The communication system 10 is configured to enable users to make connections unassisted by an operator to telephone terminals in the automatic call distribution suite and which enables telephone terminals to connect to the public network automatically. In a preferred embodiment of the invention, the communications system 10 comprises a private automatic branch exchange (PABX) which comprises a telephone switchboard device, such as FIG. 3 shows. However, in other embodiments of the invention the communications system comprises other automatic exchange mechanisms, such as Connex etc.

In the embodiment shown in FIG. 3, the communications system 10 therefore comprises a PABX as a switching system of the present invention. The communications system 10 is associated with an ACD system 12 and connected to a communications network 14 via a suitable communications link 16 capable of simultaneously supporting at least one voice channel and at least one data channel, for example, the communications network may be connected by a broadband communications link or, if an Integrated Services Digital Network (ISDN), by a primary rate ISDN link having thirty 64 kbit/s channels.

Customers, represented by telephone terminal 18, can make calls to the call centre which are processed by the ACD system in the same manner as that described with reference to FIG. 1. For example, ACD system 12 in known manner allocates the call at the head of that queue to a selected one of a plurality of call centre agent positions 20, each comprising a telephone terminal 22 and an associated computer terminal 24. The selected terminal 22 is normally that at the head of a queue of free agents. This queue contains the identities of the agents, but alternatively can contain the directory numbers associated with the agents.

Similarly, tele-working agents, represented by remote workstation 21 comprising telephone terminal 36 and associated computer terminal 38, can make calls to the call centre by dialling the published directory number of the call centre, as described below.

Each computer terminal 24 is constituted by a personal computer, commonly referred to as a PC, and is connected to a host computer 26 having an associated database 28 and connected to the PABX 310 via a CTI link 30. The system is arranged to handle a plurality of tele-working agents at respective remote workstations 21 connected to the communications network 14 via respective communication links 40. The communication links 40 provide at least one channel capable of sup-porting voice traffic and at least one channel capable of supporting data traffic. Thus calls can be made and charged independently from each of the terminals 36 and 38. The host computer 26 is connected to the communications network 14 via another communications link 42 of suitable bandwidth, for example, for voice and/or data communication.

When an agent starts a work period at a workstation 20, or at a remote workstation 21, he or she logs on to the ACD system 12 using a suitable system, for example, the Touch-Tone (Registered Trade Mark) keypad of the telephone terminal 22, 36. Alternatively, the log on procedure can be performed via the computer terminal 24, the host computer 26 and the CTI link 30, or via the computer terminal 38, the communications link 14, the link 42, the host computer 26 and the CTI link 30.

The host computer 26, constituting a call control apparatus of the present invention, is programmed to monitor activity of the call control processor (not shown) of the PABX 10 and to send command messages to the call control processor as will be described below.

The host computer 26 contains a list of the identities of a number of terminals 34, say ten terminals, which are designated as virtual turrets for tele-working only and are not disposed on a desk for use by an agent. Since these terminals 34 are not intended to be manned by an actual agent, they do not need to be functional terminals nor do they need to have associated computer terminals 24 since they are virtual turrets and are not part of operational workstations 20. Although terminals 34 can be the same as terminals 22, if desired they could be simple devices which appear to the PABX 10 as on hook telephones. Alternatively, the PABX 10 could be configured so that it has a set of port identities for association with tele-working agents, these port identities not being associated with any physical ports of the PABX 10 and being merely virtual ports. In other words, the call control processor will command connection of the ringing current generator to a selected virtual port under the control of the ACD 12, and cease the connection under the control of the host computer 26, but the PABX 10 will not be aware that these virtual ports have no physical existence.

In order to support tele-working, the ACD system 12 must still associate a tele-working agent's identity with the identity of what it deems to be an active terminal 22 in the call centre, and the present invention provides a method of performing this association.

The secure registration of telephone terminal/computer terminal according to an embodiment of the invention is effected as follows.

A remote tele-working agent is located at a computer terminal 38. The tele-working agent is provided with a first telephone number to dial into a port of the PABX 10 using telephone terminal 36. The PABX 10 communicates the fact that the first telephone number has been dialled by the tele-working agent to the host computer 26. The host computer 26 associates the first telephone number with the identity of the tele-working agent and the host computer 26 then stores the directory number of the telephone terminal 36 used to dial the first telephone number in association with the identity of the tele-working agent. The host computer 26 will refer to its record and retrieve the appropriate data. The host computer then confirms that the tele-working agent is associated with the identity of the remote terminal 38 by transmitting a second telephone number to the remote terminal 38. In some embodiments of the invention, it should be noted that the when the tele-worker dials the first telephone number, there is no "answer" to the called number, the connection of the incoming call to the "dummy number" is serves as a trigger to the host computer to provide the caller with a second number. The caller is therefore not necessarily aware that the call has been completed until the second number is conveyed to them via remote terminal 38.

The remote terminal 38 then communicates this second number to the tele-working agent again by suitable means, for example via an audio and/or visual display of the second telephone number, but means which need not be the same as the first means used to display the first telephone number. The tele-worker then calls the second telephone number (usually using the same telephone terminal 36, or alternatively another terminal capable of having the same identity or sharing the same line identity). The PABX 10 then communicates the second telephone terminal 36 identity to the host computer 26.

Again, the second number does not require the caller to necessarily be aware they have connected to an end terminal, although an indication may be provided in some embodiments of the invention. The connection is effectively virtual as it is the presence of a connection request to a particular number which is used to alert the host computer; i.e., the host computer 26 is alerted when the presence of a connection request for the second number is received by the PABX 10. The PABX 10 may then complete a connection to a dummy virtual terminal in some embodiments of the invention.

The PABX 10 may notify the host computer 26 of the connection request for the second number having been received together with the identity of the second telephone terminal which requested connection to the second number, or alternatively the receipt of a connection request for the second number passed to the host computer may trigger the host computer to request the identity of the telephone terminal requesting connection. The host computer 26 processes the information received and retrieves the information associating the telephone terminal identity with the first number dialled. If the two dialled numbers associated with the telephone terminal identity conform with the registration criteria the host computer 26 has generated for that computer terminal identity, the host computer 26 completes the registration process and associates the computer terminal 38 with the telephone terminal 36.

The host computer 26 may in other alternative embodiments of the invention require the process to be reiterated one or more times, for example, communicate a third telephone number for the tele-working agent to dial via the computer terminal 38. The telephone terminal identity used to dial the third number would then be passed on by the PABX 10 to the host computer 26. The host computer 26 processes the received information which associates the telephone terminal identity with the number dialled to confirm if the same telephone terminal identity dialled the first and second numbers according to the registration scheme implemented by the host computer 26. If the telephone terminal identity satisfies this registration criterion, then the host computer 26 is able to complete the registration process and associates the telephone terminal 36 with the computer terminal 38.

In an alternative embodiment of the invention, the PABX port to which the first telephone number is assigned to is de-activated after the first telephone number has been connected by the PABX 10 to a suitable "dummy" terminal (for example, 334A). The PABX 10 then activates a second port to which the second telephone number will connect to a second "dummy" terminal (for example 334B).

In embodiments of the invention where the PABX 10 notifies the host computer 26 of the identity of a telephone terminal 36 which has dialled a number assigned to a PABX port as soon as the request for connection to the specified number has been received, it enables the host computer 26 to configure the PABX 10 so that telephone numbers are assigned to different ports on the PABX in a suitable random manner. This further decreases the changes of an erroneous log-in by someone dialling one number and then redialling a similar number.

Although the above description is in respect of a call centre, it will be appreciated that the invention is applicable to any CTI environment involving a computer terminal attached to a host computer. The telephone terminal 36 arranged to dial in may comprise any type of device including for example, a telephone type device integrated with the user's computer terminal 38, which is capable of dialling the telephonable numbers provided to the computer terminal 38. There is no need for voice signals to be conveyed using the telephone terminal during the registration process. Accordingly, it is possible to automate the service so that a means of automatically logging the location of a computer terminal is provided. In such an embodiment, the computer terminal at a first destination is conveyed a telephone number which is then communicated to a telephone terminal, for example, via an appropriate (usually short-range) communications link. For example a wireless communications link, which may be an audio link (i.e., the telephone receiver is placed adjacent to a loudspeaker of the computer terminal), an infra-red link, or another short-range wireless communications link, for example, such as may be provided using Blue-tooth. The telephone terminal may be arranged to automatically call telephone numbers conveyed by such means (i.e. originating from that computer terminal). This enables a telephone terminal to be operated by a user to be automatically registered with a computer terminal without the user being required to perform any actions other than activating the telephone terminal and the computer terminal.

The telephone number which a user calls is (in the best mode of the invention currently contemplated by the inventors) an extension on the PABX 10, which may be a local PABX or a remote PABX. The data link between the host computer 26 and the user's computer terminal 38 which communicates the second telephone number can be a dedicated link via a data network, or via modems and the public switched telephone network. There is no need for the calls to be answered when a user has dialled a number, as it is sufficient for the request for connection to generate a notification from the PABX to the computer terminal of the identity of the telephone terminal which has rung a number associated with a port on the PABX.

In a call centre, the call control apparatus registers the identity of the telephone terminal 36 that requests a call. Whilst the call made does not need to be connected in a conventional sense in some embodiments of the invention it could be.

It is the request for connection, also herein referred to as a registration call, to the predetermined destination "dummy" telephone terminal number, for example, an extension of the switching system accessible via a port on the PABX which initiates the subsequent generation of telephonable numbers. Those skilled in the art will appreciate that some additional processing may be performed following a request for connection and these may in fact be used to initiate communication with the host computer, but nonetheless, the call made by the user does not need to be answered according to the invention. Thus there is no need to provide an IVR connected to the host computer 26 to answer the calls (where made by remote agents in an ACD environment, an IVR may of course be provided to deal with customer enquires). Instead the reception of the call to that number by the communications system exchange (i.e., the PABX 10) is used as a trigger to initiate an association process between the telephone terminal 36 which has been used to make the call and the comp terminal 38 to which the dialled number was provided.

Accordingly, the numbers which are provided via the host computer 26 to the computer terminal 38 can be any telephonable number, for example, they need not correspond to destination telephone numbers which would normally be in use. The host computer 26 is able to associate these telephonable numbers with specific ports on the PABX, so that the PABX can inform the host computer 26 when a connection request has been received for a particular number.

Not all ports on the communications system exchange (i.e. the PABX) may be used in connection with the registration process. In most embodiments, a sub-set of available ports will be used for registering one or more tele-workers and the remaining ports being used for incoming calls in a conventional ACD manner.

Some embodiments of the method of registering the association of a computer terminal with a telephone terminal according to the present invention can be used where the computer terminal is coupled to another such computer terminal via a data link. An example is where the computer terminals are connected for access to the Internet, and a first user has found a Web page relating to a second user and containing a "Call Me" link, the "Me" in this sense meaning the first user.

A known process for facilitating a "call me" process is described in U.S. Pat. No. 6,594,357 which describes how a first user clicks on the "Call Me" link, which causes his computer terminal, referred to as the first computer, to send a "Call Me" message to his Web server, referred to as the first server, containing the identity of the registered associated telephone terminal. The first server knows the identity, i.e. the network address, of the computer associated with the Web page, referred to as the second computer, and forwards the "Call Me" message to the second computer via a Web server, referred to as the second server, associated with the second computer.

On receipt at the second computer of the "Call Me" message, a screen display is generated to inform the second user that a telephone call to the displayed telephone number has been requested. The second user can now make a conventional call via his telephone terminal to that number. Alternatively, if the second user is associated with a CTI-enabled switching system, he can enter a make call command at the second computer to effect a call to that displayed telephone number.

Another example of CTI environment other than a call centre is a conventional office-type environment (or any environment provisioned with a telephone terminal and a computer terminal—i.e. there is no intended limitation for the user of the system to have any particular profession or implied work practice). The computer terminal has a telephone directory program which can be searched by the user, and when a desired telephone number has been found, the user will click his mouse button on the number. This will cause the digital data relating to the displayed number to be sent from the computer terminal, or from its host computer depending upon the arrangement, to a PABX serving the office. The PABX now acts to perform a registration process according to the invention as described above, and makes a call from the number recorded by the host computer as associated with that computer terminal to the requested number.

In the embodiments described herein above described, the registration procedures (i.e., the telephonable numbers) have been provided to the user by means of a screen display at the user's intended computer terminal. Instead, where a computer terminal has an appropriate means of conveying audio information has a sound card and loudspeakers, a speech synthesiser can be used to generate "spoken" instructions. The telephoneable numbers may be therefore be conveyed by one or more any appropriate media.

The secure registration in accordance with the present invention of a telephone terminal with a computer terminal brings advantages in a number of fields.

In a preferred embodiment, the computer is used to communicate the first telephone number to the user, which is normally achieved by displaying the telephone number. However, the first number could be a specific number assigned to the user, and subsequent iterations of the association process (for example, three numbers could be then used to confirm the association) used to increase security. In this case, the first number simply functions to trigger the subsequent generation of other telephonable numbers to the user's computer terminal.

The telephonable number communicated is provided as a coded number which a host computer generates according to a suitable number generation algorithm. The telephone number will therefore normally be only visible or otherwise communicated (e.g. audibly) to the person who receives it via the computer terminal, e.g. from the screen display. That person is then able to make the registration call from his chosen terminal, which may be the extension at the workstation, or it may be his mobile telephone. Unless a situation is contrived in which a registration call is made to the predetermined extension from a telephone terminal having an identity different from the telephone terminal which should be associated with the computer terminal to which the telephone number was conveyed, the telephone terminal registered will be associated with the correct user, enabling calls to be transferred remotely to the remote agent to be answered in a normal manner by the agent. Thus, the method mitigates the likelihood of the call control apparatus registering an incorrect telephone terminal identity in association with the computer terminal and the user's identity.

By associating a computer terminal with a telephone, a user can use his computer terminal to request an outgoing call, and a CTI controller is able to command an associated PABX (for example, the PABX serving the office) to make a call from the extension registered in association with that computer terminal. The invention can promote more responsible behaviour by a caller in a ACD environment, as the registration process is more secure.

The present invention also makes receipt of incoming calls more secure. For example, a remote call originator can either request registration information from a user's computer terminal, or the information may be sent unsolicited. They can then make a call to the telephone number of that registration information, i.e. the identity of the telephone terminal associated with that computer terminal. Depending upon the particular commands used in the signalling protocol, the identity of the telephone terminal may be the sole information in a message sent to the remote originator, or it may be associated with other information.

The registration information may be stored in the computer terminal, or it may be stored remote from the computer terminal, for example in a host computer associated with the computer terminal.

The step of providing the identity of a predetermined destination terminal number may be performed upon detection of a make call command made via that computer terminal.

The invention is arranged to be provided in any suitable form, and for example, may comprise at least one component which comprises a suite of one or more computer programs arranged to perform certain steps in the method of the invention. The method may be implemented in a distributed manner, with various steps being performed by different devices operating remotely from each other.

The invention is not intended to be limited to ACD environments but extends to any environment where it is important to ensure that communication is made with a designated computer device operator via a designated telephone link. In this context, the invention has applications in the field of software operators, and secure internet banking as it enables the identity of the computer device which is being operated by a user to be associated with the identity of a telephone terminal for the purposes of ensuring the software or banking application is being operated by a person located at a designated telephone terminal.

In the best mode of this invention currently contemplated by the inventors, the inbound calling aspects of the registration process are important as they enable a user to use this system to register a location, and then enables calls can be directed to that location.

In one embodiment of the invention, the registration method has more than one levels of security which can be implemented on a call by call basis. For example, general users could have to dial only two numbers, but executive users have to dial three for added security. The telephonable numbers which are generated could be associated with an ext. no., PC ID, login ID, computer operating system, time of day, local/remote user etc.

This invention is described operating on a conventional Private Branch Exchange (PBX) system. However, it is equally applicable to Centrex systems, public networks, IP based systems, communication systems which are wholly computer based, in fact any communication system.

In prior art methods of registration due to the cost of the IVR element, there may be only one PBX (with IVR connected) in a network of PBXs. Such registration methods require a Calling Line Identification (CLI) to be passed between PBXs, i.e. the PBXs are connected by an inter-PBX signalling protocol such as the Digital Private Networking Signalling System (DPNSS), or alternatively, the CLI needs to be released CLI onto the PSTN. In the prior art, however, the registration process will not work if no CLI is released.

An advantage of this invention, due to its cost saving aspects, is that it is possible to have one registration service per PBX. i.e. the local registration service will always see the Calling Line Identification (CLI) originating extension users directory number (DN). This is particularly useful where the registration service is managed centrally (i.e. hosted by BT) and the PBXs are left locally. A customer may hot wish to release CLI, or may not wish to pay for PSTN calls to the registration service and this can be supported by the embodiments of the invention. This invention could also be employed in the public telephone network with a parlay interface. In this environment, IVRs are very expensive recourses. This invention removes the need for that IVR.

Those skilled in the art will realise that the invention may be implemented by a combination of software and/or hardware distributed amongst one or more computer type devices within a communications network.

In alternative embodiments of the invention, it is possible for the computer terminal registration to be performed by the computer terminal providing prompts to the user to indicate whether an audible sound (for example indicative of a particular line status) is recognised by the user when the user is operating the telephone terminal having dialled the telephonable number. In such examples, no voice recognition function is provided. Instead, the PBX may cause a busy signal or particular dialling tone to be relayed to the user. The computer terminal then provides prompts for the user to indicate that if a particular sound is audible, then a particular action should be performed. Examples of possible actions include, for example, a certain subsequent number should be rung etc, during the subsequent iterations of the registration process or the telephone hung up by the user. Alternatively, the computer may be arranged to indicate to a user when the line to the host computer PBX should be cleared by the user, e.g. by hanging up. This could be done, for example, by providing a message to "hang up now" which is displayed to the user, or by providing a message to hang up at a particular time, which may be conveyed for example by means of a count-down timer. The computer may also prompt the user when to dial the telephonable number, or when to dial one or more numbers of the telephonable number.

Those skilled in the art will appreciate that the term telephoneable or a dialable telephone number has been used herein. However, in all embodiments of the invention, this term is used to indicate an identifier for some means of communication with a communications end-point. Typically, the identifier will comprise a telephoneable number, but it need not in all embodiments of the invention.

The text of the abstract repeated below is hereby incorporated into the description.

In a Computer Telephony Integration environment, to reduce the risk of inadvertent or fraudulent registration of the association of a user's computer terminal with the wrong telephone, i.e. one other than the telephone adjacent to the computer terminal or the user's mobile telephone, a host computer instructs the user via a screen display to call a particular extension of a CTI-enabled communications switching system. When a call to that extension is detected, the communications switching system reports this to the host computer which stores a set of at least one characteristics of the calling telephone terminal including a unique terminal identifier. The user is then provided with a second telephone number via the computer terminal associated with the telephone terminal which was detected as having dialled the first number. The user then dials the second destination telephone number, and when a request for connection to this number is detected by the communications switching system, this is and reported to the host computer. The host computer then compares the stored set of at least one characteristics with the equivalent set of at least one characteristics for the calling telephone terminal. The process may iterate a predetermined number of times until security criteria are met. Once a match has been determined the predetermined number of times, the telephone is registered as associated with the computer terminal. A number of variants and refinements provide for greater security against fraudulent registration.

What is claimed is:

1. A method of associating a computer terminal of a user with a communications device operable by the user within a distributed computer system comprising communications switching apparatus and call control apparatus, the method comprising performing the following:
   generating an identifier for a communications line end-point,
   communicating the identifier to the communications device via the computer terminal;
   initiating a communication with the communications line end-point by said communications device sending a request to said communications switching apparatus for connection to the identifier for said communications line end-point; and
   when the request for connection to the communications line end-point generated by the communications device is received by said communications switching apparatus within said computer system, said call control apparatus recording an identifier for the communications device; and
   checking if said device identifier has already been associated with at least one other identifier for a communications line end-point previously communicated to the computer terminal, and in the event of a match, associating the communications device of the user with the computer terminal of the user.

2. A method as claimed in claim 1, wherein the communications device is a telephone terminal.

3. A method as claimed in claim 2, wherein the identifier for a communications line end-point comprises a sequence of numerical digits.

4. A method as claimed in claim 3, wherein the sequence of numerical digits comprises a telephonable number.

5. A method as claimed in claim 1, wherein the identifier is communicated to the communications device via the computer terminal communicating the identifier for the communications line end-point to the user.

6. A method as claimed in 5, wherein the computer terminal communicates the identifier by displaying it to the user.

7. A method as claimed in claim 5, wherein the computer communicates the identifier by audibly announcing it to the user.

8. A method as claimed in claim 1, wherein the identifier for the communications line end-point is automatically communicated to the communications device.

9. A method as claimed in claim 5, wherein the identifier for the communications line end-point is automatically communicated to the communications device, and wherein an icon is displayed to the user by the computer terminal, and by activating the icon the computer terminal automatically communicates the identifier for the communications line end-point to the communications device.

10. A method as claimed in claim 8, wherein the identifier is automatically communicated using a wireless communications link between the computer terminal and the communications device.

11. A method as claimed in claim 8, wherein the communications link is short-range.

12. A method as claimed in claim 1, further comprising in the event no match is obtained, iterating the steps of the method recited in claim 1 at least once.

13. A method as claimed in claim 2, wherein in at least the second iteration of the method steps, the identifier for the communications line end-point is communicated to the computer terminal only in response to a previous identifier for the communications device identity being associated with the computer terminal.

14. A method as claimed in claim 1, wherein the communications switching apparatus comprises an automatic branch exchange.

15. A method as claimed in claim 1, wherein the communications switching apparatus comprises a private automatic branch exchange.

16. A method as claimed in claim 1, wherein the computer terminal is arranged to prompt the user to perform at least one additional action when requesting connection to the communications line end-point.

17. A method as claimed in claim 16, wherein an additional action performed by the user is to cause the communications device to revert to an on-hook status at a predetermined time.

18. A method as claimed in claim 16, wherein an additional action performed by the user is to cause the communications device to go off-hook at a predetermined time.

19. A method as claimed in claim 7, wherein an additional action to be performed by the user is to enter information on the computer terminal indicative of a signal audible by the user over the communications line used to request connection to the identifier for the communications end-point.

20. A computer terminal comprising components arranged to perform appropriate steps in the method of claim 1.

21. Apparatus comprising components arranged to receive requests for connection and to implement appropriate steps in the method according to claim 1.

22. A computer system comprising: a computer terminal comprising components arranged to perform steps according to the method of claim 1.

23. Computer-readable storage media containing computer program code arranged in use to be installed on the computer terminal and arranged when loaded to enable the computer terminal to perform the steps of claim 1.

24. Computer-readable storage media containing computer program code arranged in use to be installed on apparatus comprising components arranged to receive requests for connection and to implement steps of claim 1 when said program code is loaded into and executed by said apparatus.

* * * * *